United States Patent [19]

Carre

[11] 4,219,242

[45] Aug. 26, 1980

[54] BRAKING CORRECTION DEVICE

[75] Inventor: Jean J. Carre, Montreuil, France

[73] Assignee: Societe Anonyme D.B.A, Paris, France

[21] Appl. No.: 883,099

[22] Filed: Mar. 3, 1978

[30] Foreign Application Priority Data

Mar. 11, 1977 [FR] France .................. 77 07361

[51] Int. Cl.² ............................... B60T 8/26
[52] U.S. Cl. .................... 303/6 C; 303/22 R
[58] Field of Search ............... 188/195, 349; 303/6 C, 303/22 R, 22 A

[56] References Cited

U.S. PATENT DOCUMENTS

| | | | |
|---|---|---|---|
| 3,088,285 | 5/1963 | Giacosa et al. | 303/6 C |
| 3,362,758 | 1/1968 | Goerke et al. | 303/22 R |
| 3,393,946 | 7/1968 | Julow | 303/22 A |
| 3,443,382 | 5/1969 | Baldwin | 303/6 C X |
| 3,488,095 | 1/1970 | Rath | 303/22 R X |
| 3,508,792 | 4/1970 | Bueler | 303/22 A X |
| 3,554,611 | 1/1971 | Kawabe et al. | 303/6 C |
| 3,701,616 | 10/1972 | Kawai | 303/22 R |
| 3,904,253 | 9/1975 | Riquart | 303/22 R |
| 4,060,283 | 11/1977 | Demido et al. | 303/22 R X |

Primary Examiner—Duane A. Reger
Attorney, Agent, or Firm—Paul David Schoenle; Ken C. Decker

[57] ABSTRACT

A braking correction device has a stepped bore which is divided into an inlet chamber and an outlet chamber by a piston. A control valve is disposed in a passage of the piston and is normally open when the piston occupies a rest position. When the pressure in the inlet chamber rises, the control valve remains open until such pressure has reached a predetermined value, and fluid communication between the inlet and outlet chambers through said control valve is metered when the pressure in the inlet chamber increases above said predetermined value. The piston is urged towards its rest position under the influence of a return force delivered by a control member connected to the suspension of the vehicle, and abutting the piston at its outer end. The inlet and outlet chambers can also communicate by a passage defined between the outer periphery of the piston and the inner surface of the bore. An annular ring is disposed in said passage and acts as a non-return valve allowing fluid communication only from the outlet chamber towards the inlet chamber. At its outer end the piston also comprises a blind bore opening towards said control member. A light spring is disposed in said blind bore and has one end abutting the bottom of said blind bore and its other end abutting the control member. The spring permits to overcome the force resulting from the residual pressure in the outlet chamber to return the piston in its rest position, at the end of a brake decrease phase, even if the force transmitted from the control member is weak.

1 Claim, 3 Drawing Figures

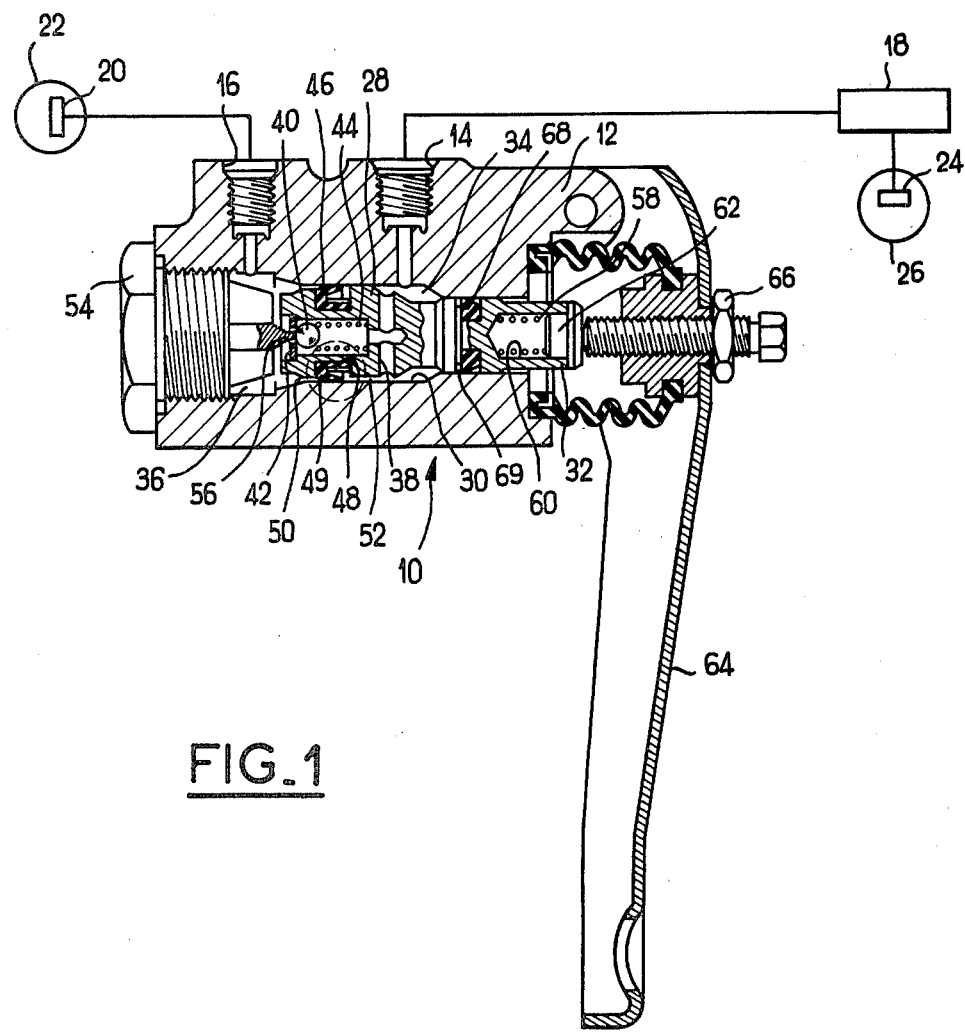
FIG_1
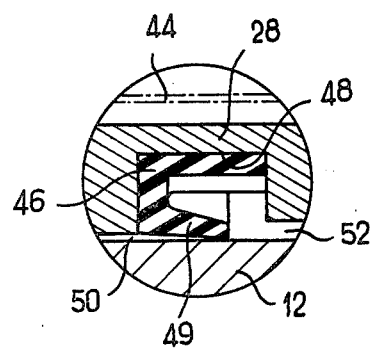
FIG_2

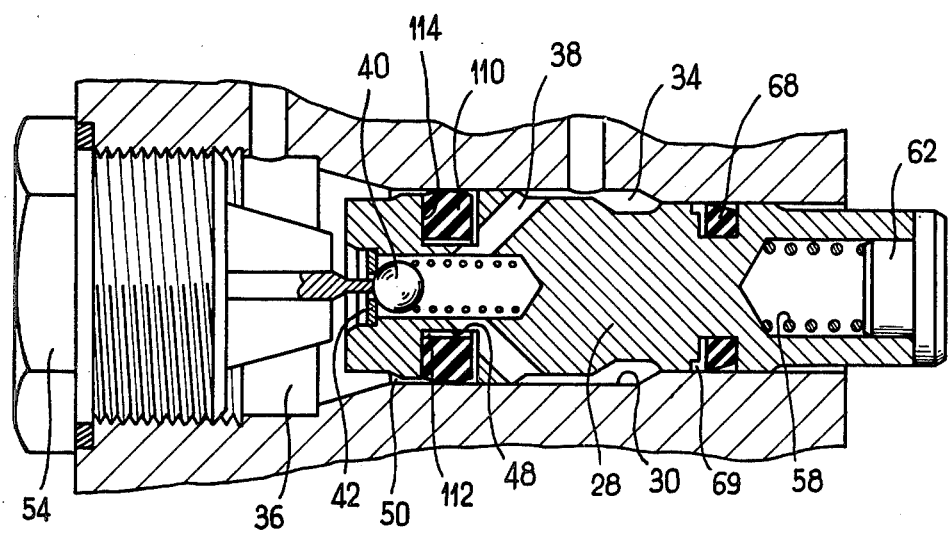
FIG_3

BRAKING CORRECTION DEVICE

The invention relates to a braking correction device for insertion in the pressure fluid line between a brake fluid source and a set of brake actuators (wheel cylinders) in a motor vehicle.

In known braking devices used in vehicles a first set of brakes associated with the front wheels of the vehicle is connected directly to the pressure source, whereas a second set of brakes associated with the rear wheels of the vehicle is connected to the pressure source by way of the correction device. This type of device makes it possible to prevent an excessive rise in pressure in the brake actuators for the rear wheels and so to eliminate any risk of locking of the rear wheels.

The braking correction devices in the prior art are of the type with a differential piston comprising a housing provided with a stepped bore in which the differential piston is installed so as to define therein a first and a second pressure chambers, termed the inlet and outlet chambers, which respectively adjoin the piston end faces of smaller and larger cross-section, the first chamber being connectable to the pressure source whereas the second chamber is connectable to the set of brake actuators, the chambers communicating by way of a passage extending through the piston, a valve member being mounted in the passage and being resiliently urged into fluid tight contact with a seat provided on the piston, and a return device acting on the piston so as to urge the latter inwards into the second chamber into an idle position which is fixed relative to the housing and for which the valve member is lifted off its seat due to engagement with an abutment situated in the second chamber. The operation of these correction devices is of the type having three phases: In the first phase the pressure in the first chamber begins to increase but remains too low to lift the piston off the abutment, and the pressures in the first and second chambers are identical; in the second phase, the pressure in the second chamber reaches a predetermined value high enough to cause the valve member to close, and any further increase in the pressure produces alternate opening and closing of the valve member due to movements of the piston relative to the abutment, so that the rate of pressure increase in the brake actuators for the rear wheels is reduced beyond the said predetermined value; and in the third phase, corresponding to a reduction in pressure in the first chamber, the piston is urged off the fixed abutment, and the pressure in the second chamber decreases. When the pressure in the first chamber falls below that in the second chamber, the pressure difference is sufficient to lift the valve member overcoming the resilient means which bias it, and to allow the fluid to return to the first chamber.

However, when the pressure in the second chamber has become too low to lift the valve member, some fluid under residual pressure remains in the second chamber, from which it cannot normally escape. This pressure fluid acts on the differential piston's surface of larger cross-section. In order, therefore, at the end of braking to return the piston to its idle position, in which the abutment lifts the ball valve to enable fluid to flow freely between the inlet and outlet chambers, there must be sufficient piston operating force to overcome the opposing force exerted by the residual pressure in the outlet chamber. This operating force determines the lowest threshold (or operating point) obtainable with this correction device, the threshold corresponding to the inlet pressure at which the valve begins to exert its compensating effect. In other words, the threshold corresponds to the kink in the characteristic of the correction device. It has been found, however, that in the case of some unloaded or lightly loaded vehicles the threshold determined by the operating force is too high.

The invention relates to a correction device of the type described above, comprising means for lowering its threshold pressure. The said means in a correcting device embodying the invention is designed to reduce to a minimal value the residual pressure prevailing in the rear chamber at the end of braking relief.

To this end, the invention proposes a braking correction device for insertion between a pressure source and at least a brake actuator in a motor vehicle of the type comprising a housing having a stepped bore defined therewithin, said bore having a large diameter portion and a small diameter portion with a differential piston having corresponding large diameter and small diameter portions being mounted in said bore so as to define therein first and second pressure chambers respectively adjoining the piston end faces of smaller and larger cross-section areas, the first pressure chamber being connectable to the pressure source whereas the second pressure chamber is connectable to the set of brake actuators, a passage extending through said piston for communicating said first and said second pressure chambers, a valve member mounted in said passage and resiliently urged into fluid-tight contact with a seat provided on the piston, a return device acting on the piston so as to urge the latter inwards into the second chamber towards an idle position which is fixed relative to the housing, and for which the valve member is lifted off its seat, due to engagement with an abutment disposed in said second chamber, said compensating device being characterized in that it comprises a first ring seal disposed between the piston and the bore, the seal being situated on a fluid flow path between the first and second chambers, and forming a non-return valve permitting fluid to flow from the second chamber to the first chamber when the pressure difference between said second and first chambers is greater than a predetermined threshold value, and preventing fluid from flowing in the opposite direction, said small diameter portion of the piston having a blind axial bore defined at its end, said return device comprising a movable member operated by the suspension of the vehicle, and spring means disposed in said blind axial bore, one end of said spring means abutting the bottom of said blind axial bore whereas its other end bears on said movable member.

The invention will be better understood, and further advantages will be apparent, from the ensuing description referring to the accompanying drawings, in which:

FIG. 1 represents an axial section through a braking correction device embodying the invention;

FIG. 2 illustrates a circled portion of FIG. 1 on a larger scale; and

FIG. 3 represents a section through the piston of the correction device, with different means for lowering the threshold.

FIG. 1 illustrates a braking correction device 10 of the compensating type comprising a housing 12 having two orifices 14, 16 connected respectively to a pressure fluid source 18 and to a set 20 of brake actuators associated with the rear wheels 22 of a motor vehicle. The pressure fluid source 18, which by way of example is a tandem master cylinder, is connected to the orifice 14 and also to a set 24 of brake actuators associated with the front wheels of the vehicle. A differential piston 28 is slidable in a fluid-tight manner in a stepped bore 30 in the housing 12, from which it projects at 32. The piston 28 separates bore 30 in two chambers defined in the housing: the first chamber 34, termed the inlet chamber, which adjoins that end face of the differential piston having the smaller effective cross-section and is connected to the inlet orifice 14; and the second chamber 36, termed the outlet chamber, which adjoins that end face of the differential piston having the larger effective cross-section and is connected to the outlet orifice 16. A passage traversing the piston 28 connects the two chambers 34, 36. Inside this passage, a ball valve member 40 is biased by a weak spring 44 on to a valve seat 42 mounted in the piston 28. A first ring seal 46 is mounted in a groove 48 in a bearing surface of the piston 28 which separates the inlet chamber 34 from the outlet chamber 36. The seal 46 is a lipped cup seal installed at the bottom of the groove 48, the cup bearing a peripheral lip 49 which cooperates with the surface of the bore 30 to define a non-return valve. The non-return valve allows fluid to flow from an annular space 50 adjoining the outlet chamber 36 to one or more axial slots 52 in the piston (only one slot being shown in FIG. 1) communicating with the inlet chamber, when the pressure difference between the inlet and outlet chambers exceeds a predetermined value; however, the non-return valve prevents fluid from flowing in the opposite direction.

The chamber 36 is closed by a plug 54 screwed into the bore 30. The plug 54 supports a fixed plunger 56 forming an abutment, by which the ball 40 can be supported and raised away from the valve seat 42 when the piston 28 moves towards the left-hand end of the bore.

The differential piston is urged inwards into the chamber 36 by resilient return means 58 situated in a blind axial bore 60 in the piston 28. The resilient return means 58 comprise a weak spring of which one end bears on the bottom of the blind bore whereas its other end bears on a pushrod 62 projecting into the blind bore 60 and having a flange forming portion defining a stop abutting the open end of said blind bore.

The push rod 62 and piston 28 are urged to the left by means of a lever 64 pivoted on the housing. The free end of the lever 64 can be connected to the suspension of the vehicle so that the setting of the piston of the correction device can be adjusted by means of a setscrew 66. Also, for operation with a low threshold, the resilient return means 58 inserted between the lever and the piston of the compensating device provide stability at the minimum threshold. This is because the characteristic of the spring 58 gives a substantially constant operating force, so that its load is little affected by the position of the operating lever during operation with a low threshold.

In addition a second, substantially frustro-conical seal 68 is provided in a groove in the piston 28, its larger end face turned towards the chamber 34 and its smaller end face turned towards the atmosphere. The outer peripheral surface of the seal 68 is in contact with the surface of the bore in the housing 12, near its larger end, and the seal is flexible enough to behave like a diaphragm when the piston 28 first begins to move to the right, so minimizing friction during this first phase. The piston is provided with an annular shoulder 69 (best shown in FIG. 3) adjoining the larger end face of the seal 68, so that when the piston 28 starts moving to the right the seal 68 bends, engaging the annular shoulder 69, without moving relative to the housing.

Note that FIG. 1 does not show the piston 28 in its idle position, in which the ball is lifted away of its seat by the abutment 56. In this Figure the differential piston is a few millimeters to the right of the idle position, in the limit position in which the ball 40 is just bearing on the seat 42 and disconnecting the two chambers 34, 36.

The correction device just described operates as follows. When the brake circuit is idle, the resilient means 58 urges the differential piston to the left in FIG. 1, so that the ball 40 is lifted by the plunger 56 and the two chambers 34, 36 communicate. When the driver depresses the brake pedal, the pressure will rise simultaneously in both brake actuator sets 20, 24. Observation of the pressure in the brake actuator set 20 for the rear wheels of the vehicle reveals a first phase in which the two chambers 34, 36 still communicate. At a predetermined inlet pressure P1, which moreover varies with the force urging the piston to the left according to the distribution of the loads on the axles of the vehicle, the motion of the piston to the right in FIG. 1 will cover a distance such that the ball 40 is in fluid-tight contact with the seat 42. Consequently, a second braking phase will occur, during which the piston will oscillate about this limit position and the valve 40 will therefore keep opening and closing. Assuming that the load distribution between the axles of the vehicle is constant, the rate of pressure increase at the outlet orifice is substantially linear, but it is lower than during the first phase. A graph plotting the pressure in the outlet chamber as a function of the pressure in the inlet chamber would show the second operating phase as a straight line whose gradient equals the ratio between the effective cross-sections of the opposite ends of the differential piston 28. In the case of a correction device set to a low threshold, the force applied to the piston of the correction device determining the value of the threshold pressure is exerted essentially by the spring 58. Also, the very low initial tension of the spring 58 ensures that the valve is fully open in the idle position.

When the driver releases the brake pedal, the pressure drops in the chamber 34, and the piston 28 tends to move to the right, urging the ball 40 on to its seat 42 and stopping the flow of fluid. The pressure in the rear circuit falls slightly owing to the increase in volume of the chamber 36. At a given moment the fluid pressure in the rear circuit becomes greater than the pressure in the front circuit, so that the pressure difference between the chambers 34 and 36 is sufficient to lift the ball 40 off its seat 42, counter-acting the spring 44, and to allow brake fluid to return to the master cylinder by way of the passage 38. Also, on account of the pressure difference, fluid also flows along the annular passage 50, lifts up the lip 49 of the cup seal 46 and enters the chamber 34 by way of the passage 52. Beyond a certain pressure in the rear chamber, the valve member in the passage 38 can no longer be opened. Fluid can now flow only by way of the non-return valve, until the residual pressure (of the order of 0.1 to 0.2 bar in this embodiment) in the second chamber is too low to lift the lip 49. As a result the force exerted by the pressure in the rear chamber 36 and acting on the piston 28 is distinctly lower than the force which would exist in a correction device in which fluid-tightness between the front and rear chambers was provided by a conventional ring seal. In the latter case the residual pressure would be distinctly higher. Because of the low residual pressure in the outlet chamber, the operating force which must be applied to the piston so that the abutment 56 opens the valve is very small and is supplied essentially by the spring 58. The inlet and outlet chambers now communicate again, and the device is ready for another operating cycle in which the threshold is relatively low.

Of course, it will be appreciated that that pressure difference between the two chambers which can cause the non-return valve to open has been given only by way of example, and that the pressure threshold determined by the non-return valve corresponds to a minimal pressure force for the opening of the valve and can be determined according to the shape of the characteristic desired.

With reference to FIG. 3, the differential piston 28 mounted in the bore 30 is substantially identical to the piston shown in FIG. 1, and like elements bear the same reference numerals. The piston 28 in FIG. 3 has a seal forming a non-return valve, but the design of this seal is very different from that of the seal 46 shown in FIG. 1. In this embodiment the seal is a ring 110 of elastomeric material, well-known to those skilled in the braking art as a Baldwin seal. The ring 110 is inserted with axial clearance in the groove 48 in the piston 28. The dimensions of the annular ring 110 are such as to leave an annular space 112 between its inner peripheral surface and the bottom of the groove 48. This space 112 communicates permanently with the passage 38, connected in turn to the inlet chamber 34. Also, the outer peripheral surface of the seal 110 is in fluid-tight contact with the surface of the bore 30.

When the brakes are applied, the pressure in the inlet chamber urges the ring 110 on to the surface of the bore 30 and on to that shoulder 114 of the groove 48 adjoining the outlet chamber 36 and no fluid can flow by way of the groove 48.

During the release of the brakes, when the pressure difference between the outlet chamber 36 and the inlet chamber 34 becomes high enough to overcome the friction, the ring 110, being mounted with clearance in the groove, comes clear of the shoulder 114, and a passage forms between the shoulder 114 and the surface opposite to it on the ring 110. This passage communicates with the annular space 112, and fluid can flow from the chamber 36 to the chamber 34 by way of the annular space 52, the passage between the shoulder 114 and ring 110 the annular space 112 and the passage 38.

What we claim is:

1. In a braking correction device, the combination of a housing having an inlet, an outlet, and a bore communicating with the inlet and the outlet, a differential piston sealingly engageable with a wall of the bore to substantially define a first chamber and a second chamber, the first chamber communicating with the inlet and the second chamber communicating with the outlet, a passage within the differential piston communicating the first chamber with the second chamber, a valve member disposed within the passage and cooperating with the differential piston to open and close the passage in response to movement of the differential piston within the bore, return means acting against the differential piston to bias the latter to an idle position wherein the valve member opens the passage, the piston defining a blind axial bore, the return means including a movable member movably disposed within the blind axial bore and a lever pivoted on the housing, the movable member being biased by a spring within the blind axial bore against the lever, said spring having a substantially constant operating force to apply the same force to the differential piston and movable member throughout the pivotal movement of the lever and the movement of the differential piston, and said movable member defining a stop engageable with the differential piston to limit contraction of said spring.

* * * * *